United States Patent
Monaghan et al.

(10) Patent No.: US 11,435,081 B2
(45) Date of Patent: Sep. 6, 2022

(54) METHODS OF SERVICING A FUEL NOZZLE TIP

(71) Applicant: General Electric Company, Schenectady, NY (US)

(72) Inventors: James Christopher Monaghan, Spartanburg, SC (US); Jacob Wade Word, Simpsonville, SC (US); Paula Marie Word, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/006,045

(22) Filed: Aug. 28, 2020

(65) Prior Publication Data
US 2022/0065455 A1 Mar. 3, 2022

(51) Int. Cl.
| | |
|---|---|
| *B23P 6/00* | (2006.01) |
| *F23R 3/28* | (2006.01) |
| *B05B 15/50* | (2018.01) |
| *B05B 7/06* | (2006.01) |
| *B05B 7/10* | (2006.01) |
| *B23K 1/00* | (2006.01) |
| *F02C 7/228* | (2006.01) |

(52) U.S. Cl.
CPC ............ *F23R 3/28* (2013.01); *B05B 7/06* (2013.01); *B05B 7/10* (2013.01); *B05B 15/50* (2018.02); *B23K 1/0008* (2013.01); *B23P 6/00* (2013.01); *B23P 6/005* (2013.01); *F02C 7/228* (2013.01); *F05D 2220/32* (2013.01); *F05D 2230/80* (2013.01)

(58) Field of Classification Search
CPC ........... B23P 6/005; B23P 6/002; B23P 6/045; F05D 2230/72; F05D 2230/80
See application file for complete search history.

(56) References Cited

U.S. PATENT DOCUMENTS

| | | |
|---|---|---|
| 4,509,299 A | 4/1985 | Guertin |
| 5,685,139 A | 11/1997 | Mick et al. |
| 8,079,218 B2 | 12/2011 | Widener |
| 9,021,675 B2 | 5/2015 | Rose |
| 9,995,487 B2 | 6/2018 | Rose |
| 2013/0298368 A1* | 11/2013 | Arellano ................. B23P 6/005 29/402.19 |

(Continued)

FOREIGN PATENT DOCUMENTS

| | | |
|---|---|---|
| EP | 2884183 A1 | 6/2015 |
| WO | WO2009126701 A2 | 10/2009 |

OTHER PUBLICATIONS

European Search Report Corresponding to Application No. 21190912 dated Jan. 18, 2022.

*Primary Examiner* — Christopher J Besler
(74) *Attorney, Agent, or Firm* — Dority & Manning, P.A.

(57) ABSTRACT

Methods of servicing a fuel nozzle are provided. a method of servicing a fuel nozzle includes a step of machining away material from a nozzle tip of the fuel nozzle to form an annular groove within the nozzle tip. The method further includes a step of inserting a replacement coupon into the annular groove. The replacement coupon having a radially outermost that corresponds to the annular groove and a post-removal contact surface. The method further includes a step of fixedly coupling the radially outermost of the replacement coupon to the annular groove.

9 Claims, 9 Drawing Sheets

(56) References Cited

U.S. PATENT DOCUMENTS

| | | | |
|---|---|---|---|
| 2014/0064954 A1 | 3/2014 | Singh et al. | |
| 2015/0167983 A1 | 6/2015 | McConnaughhay et al. | |
| 2017/0080530 A1* | 3/2017 | McGhee | B23K 15/0006 |
| 2017/0146235 A1* | 5/2017 | Marchal | B23K 15/04 |
| 2018/0266694 A1 | 9/2018 | Johnson et al. | |
| 2019/0375008 A1* | 12/2019 | Barua | B33Y 80/00 |

\* cited by examiner

METHODS OF SERVICING A FUEL NOZZLE TIP

FIELD

The present disclosure relates generally to turbomachine fuel nozzles. In particular, the present disclosure relates to a method of servicing a turbomachine fuel nozzle tip.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

Gas turbines typically include fuel nozzles in the combustor section. Each fuel nozzle is a component having one or more passages for delivering a mixture of fuel and air to a combustion chamber for ignition. During operation of the turbomachine, each of the fuel nozzles may be exposed to various forces and stresses, e.g., vibrational forces and thermal stresses, which can cause wear to one or more sub-components of the fuel nozzles over time. In some cases, wear to a single sub-component of a fuel nozzle can result in repairing or replacing the entire fuel nozzle, which can be a costly and time-consuming service process.

Accordingly, an improved method for servicing a fuel nozzle is desired in the art. In particular, a method of servicing a fuel nozzle that advantageously restores a worn fuel nozzle sub-component without replacing the entire sub-component and/or fuel nozzle.

BRIEF DESCRIPTION

Aspects and advantages of the methods of servicing a fuel nozzle in accordance with the present disclosure will be set forth in part in the following description, or may be obvious from the description, or may be learned through practice of the technology.

In accordance with one embodiment, a method of servicing a fuel nozzle is provided. The method includes a step of removing material from a nozzle tip of the fuel nozzle to form an annular groove within the nozzle tip. The method further includes a step of inserting a replacement coupon into the annular groove. The replacement coupon having a radially outermost that corresponds to the annular groove and a post-removal contact surface. The method further includes a step of fixedly coupling the radially outermost of the replacement coupon to the annular groove.

In accordance with another embodiment, a method of servicing a fuel nozzle is provided. The method includes a step of furnishing the fuel nozzle that has undergone at least one duty cycle. The method further includes a step of removing material from a nozzle tip of the fuel nozzle to form an annular groove within the nozzle tip. The method further includes a step of inserting a replacement coupon into the annular groove. The replacement coupon having a radially outermost that corresponds to the annular groove and a post-removal contact surface. The method further includes a step of fixedly coupling the radially outermost of the replacement coupon to the annular groove.

These and other features, aspects and advantages of the present methods of servicing a fuel nozzle will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present methods of servicing a fuel nozzle, including the best mode of making and using the present systems and methods, directed to one of ordinary skill in the art, is set forth in the specification, which makes reference to the appended figures, in which.

DETAILED DESCRIPTION

Reference now will be made in detail to embodiments of the present methods of servicing a fuel nozzle, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component. terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Figure 1:
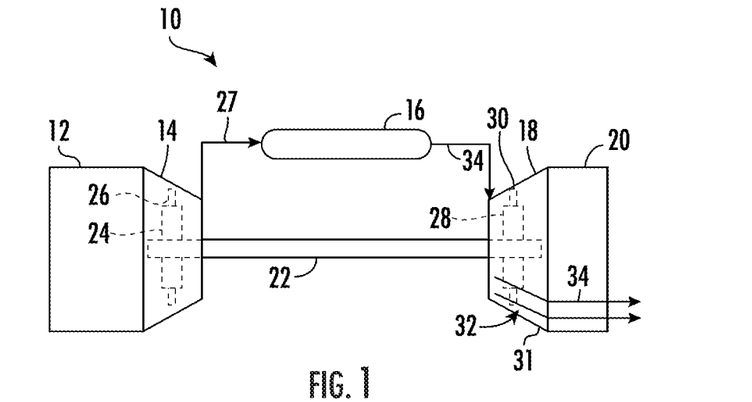
FIG. 1 is a schematic illustration of a turbomachine, in accordance with embodiments of the present disclosure.

Referring now to the drawings, FIG. 1 illustrates a schematic diagram of one embodiment of a turbomachine, which in the illustrated embodiment is a gas turbine 10. Although an industrial or land-based gas turbine is shown and described herein, the present disclosure is not limited to a land-based and/or industrial gas turbine unless otherwise specified in the claims. For example, the fuel nozzles as described herein may be used in any type of turbomachine including, but not limited to, a steam turbine, an aircraft gas turbine, or a marine gas turbine.

Figure 2:
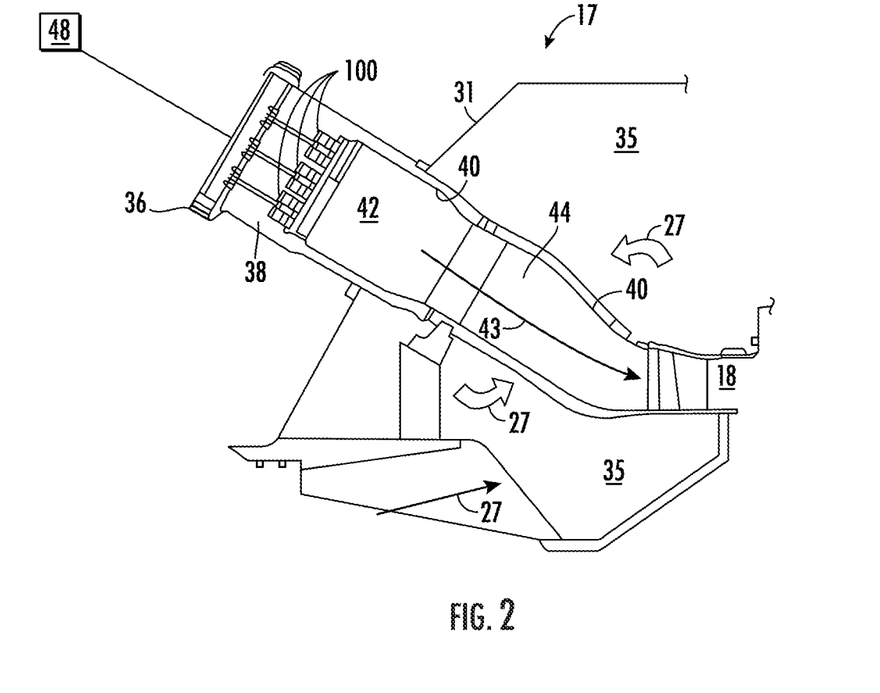
FIG. 2 illustrates a combustor suitable for use with the turbomachine of FIG. 1, in accordance with embodiments of the present disclosure.

As shown, the gas turbine 10 generally includes an inlet section 12, a compressor section 14 disposed downstream of the inlet section 12, a plurality of combustors 17 (one of which is shown in FIG. 2) within a combustor section 16 disposed downstream of the compressor section 14, a turbine section 18 disposed downstream of the combustor section 16, and an exhaust section 20 disposed downstream of the turbine section 18. Additionally, the gas turbine 10 may include one or more shafts 22 coupled between the compressor section 14 and the turbine section 18.

The compressor section 14 may generally include a plurality of rotor disks 24 (one of which is shown) and a plurality of rotor blades 26 extending radially outwardly from and connected to each rotor disk 24. Each rotor disk 24 in turn may be coupled to or form a portion of the shaft 22 that extends through the compressor section 14.

The turbine section 18 may generally include a plurality of rotor disks 28 (one of which is shown) and a plurality of rotor blades 30 extending radially outwardly from and being interconnected to each rotor disk 28. Each rotor disk 28 in turn may be coupled to or form a portion of the shaft 22 that extends through the turbine section 18. The turbine section 18 further includes an outer casing 31 that circumferentially surrounds the portion of the shaft 22 and the rotor blades 30, thereby at least partially defining a hot gas path 32 through the turbine section 18.

During operation, a working fluid such as air flows through the inlet section 12 and into the compressor section 14 where the air is progressively compressed, thus providing pressurized air 27 to the combustors of the combustor section 16. The pressurized air 27 is mixed with fuel and burned within each combustor to produce combustion gases 34. The combustion gases 34 flow through the hot gas path 32 from the combustor section 16 into the turbine section 18, wherein energy (kinetic and/or thermal) is transferred from the combustion gases 34 to the rotor blades 30, causing the shaft 22 to rotate. The mechanical rotational energy may then be used to power the compressor section 14 and/or to generate electricity. The combustion gases 34 exiting the turbine section 18 may then be exhausted from the gas turbine 10 via the exhaust section 20.

As shown in FIG. 2, the combustor 17 may be at least partially surrounded by the outer casing 31, which may be referred to as a compressor discharge casing. The outer casing 31 may at least partially define a high-pressure plenum 35 that at least partially surrounds various components of the combustor 17. The high-pressure plenum 35 may be in fluid communication with the compressor 14 (FIG. 1) to receive the compressed air 27 therefrom. An end cover 36 may be coupled to the outer casing 31. In particular embodiments, the outer casing 31 and the end cover 36 may at least partially define a head end volume or portion 38 of the combustor 17.

In particular embodiments, the head end portion 38 is in fluid communication with the high-pressure plenum 35 and/or the compressor 14. One or more liners or ducts 40 may at least partially define a combustion chamber or zone 42 for combusting the fuel-air mixture and/or may at least partially define a hot gas path through the combustor as indicated by arrow 43, for directing the combustion gases 34 towards an inlet to the turbine 18.

In various embodiments, the combustor 17 includes at least one fuel nozzle 100 at the head end portion 38. As shown in FIG. 2, the fuel nozzle 100 may be disposed within the outer casing 31 downstream from and/or spaced from the end cover 36 of the combustor 17 and upstream from the combustion chamber 42. In particular embodiments, each of the fuel nozzles 100 may be in fluid communication with fuel supply 48.

Figure 3:
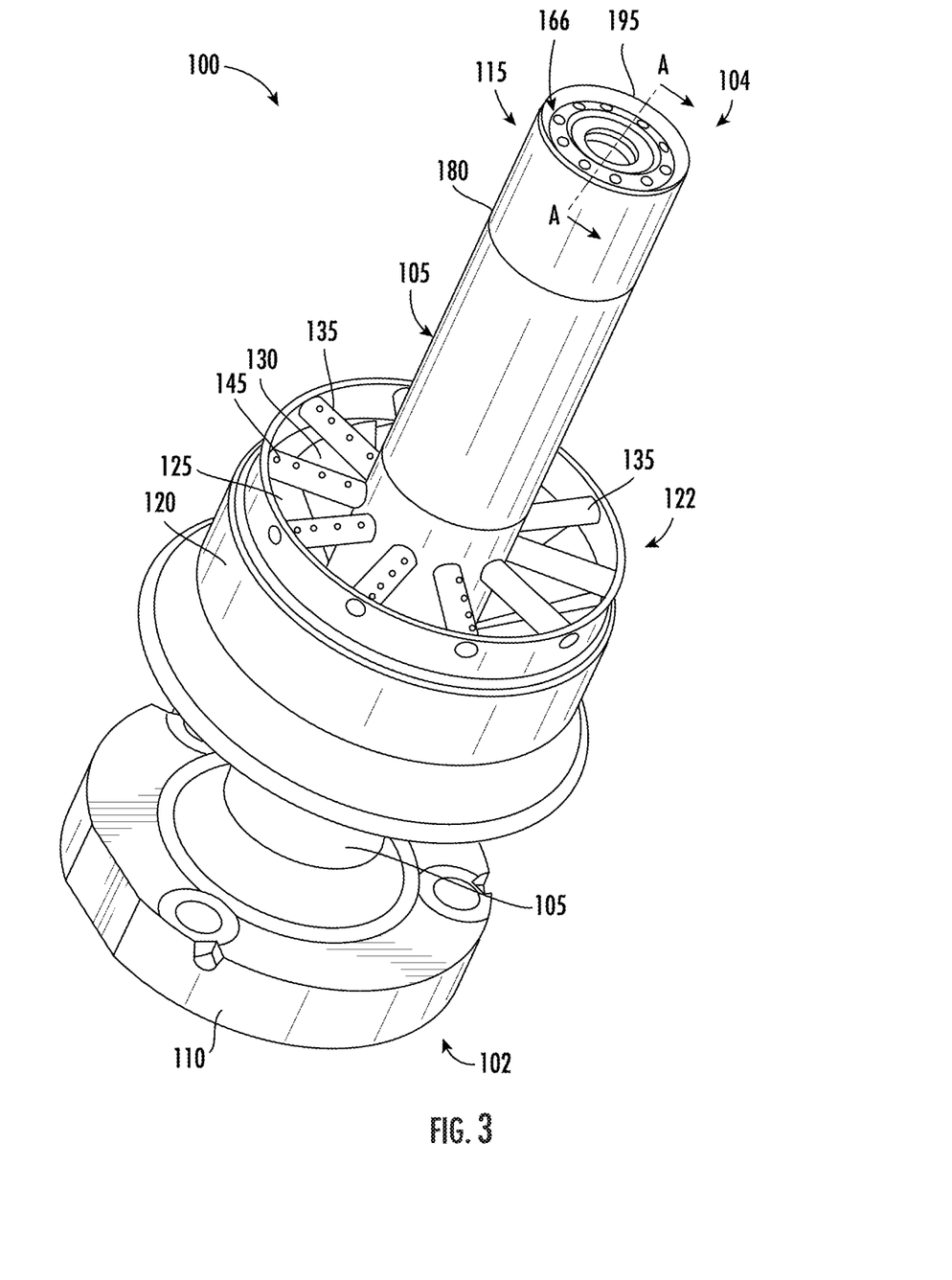
FIG. 3 illustrates a perspective view of a fuel nozzle for use within the combustor of FIG. 2, in accordance with embodiments of the present disclosure.
Figure 4:
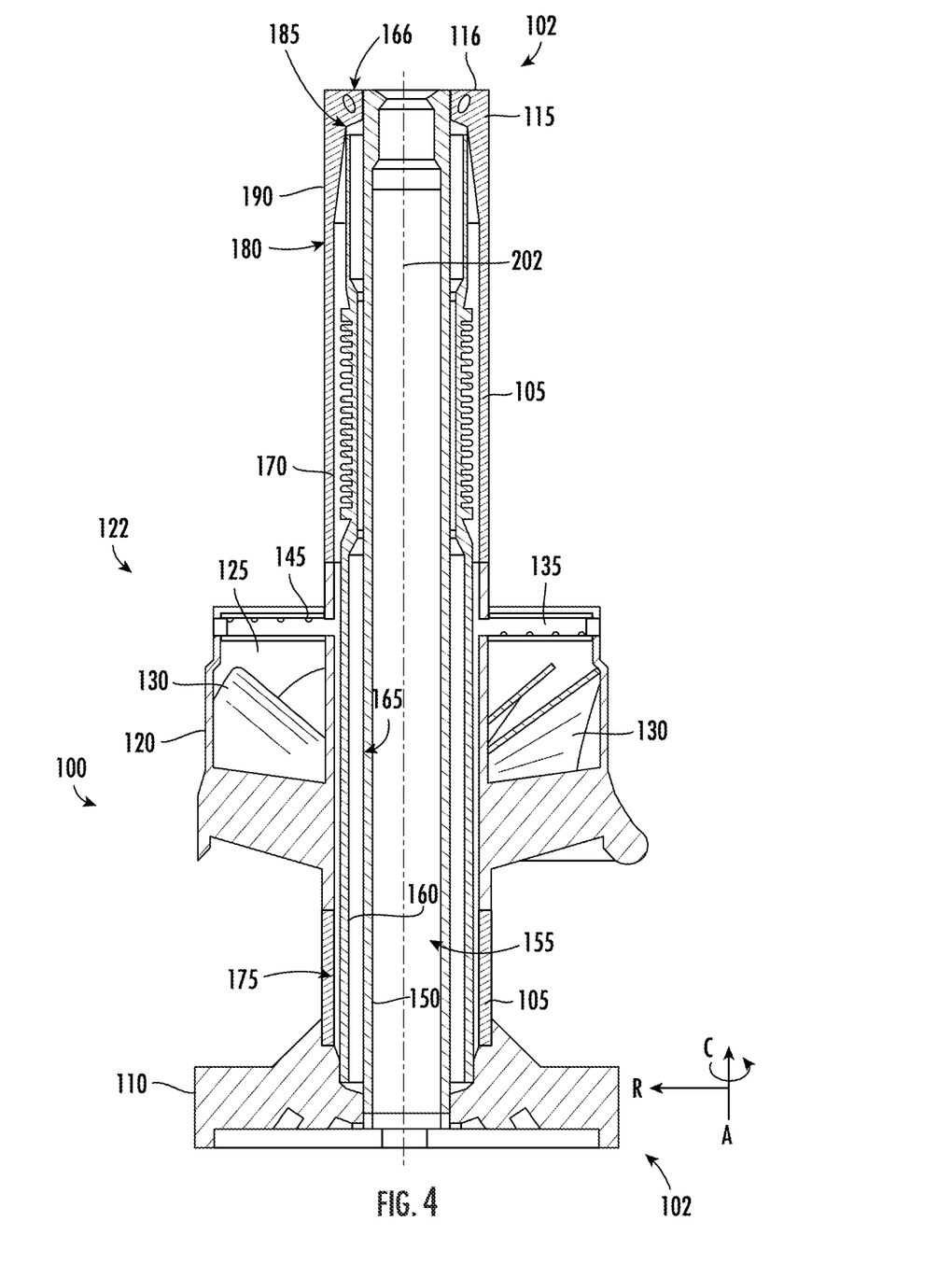
FIG. 4 illustrates a cross-sectional side view of a fuel nozzle, in accordance with embodiments of the present disclosure.

FIG. 3 is a perspective view of a fuel nozzle 100 and FIG. 4 is a cross-sectional view of the fuel nozzle 100. As shown, the fuel nozzle 100 may define an axial direction A and a circumferential direction C, which extends around the axial direction A. The fuel nozzle 100 may also define a radial direction R perpendicular to the axial direction A.

In particular embodiment, the fuel nozzle 100 may extend between a forward end 102 and an aft end 104. In many embodiments, the fuel nozzle 100 may include a flange 110 disposed at the forward end 102 and a nozzle tip 115 disposed at the aft end 104 of the fuel nozzle 100. The flange 110 may couple the fuel nozzle 100 to the end cover 36 of the combustor 17. As shown, the nozzle tip 115 may define an aft face 116, which may be the aft most surface of the fuel nozzle 100. In many embodiments, the fuel nozzle 100 may include a nozzle body 105 that extends axially between the flange 110 and the nozzle tip 110. At its tip portion, fuel nozzle 100 also includes a forward fuel/air delivery section at nozzle tip 115. In various embodiments, the fuel nozzle 100 may further include a swirler 122 that extends radially outwardly from the nozzle body 105 and is disposed between the forward end 102 and the aft end 104 of the fuel nozzle 100. The swirler may include a collar 120 that surrounds a portion of the nozzle body 105. An annular passage 125 may be defined between the collar 120 and the nozzle body 125. A plurality of swirler vanes 130 may be disposed within the annular passage 125 and may each extend between the nozzle body 105 and the collar 120. As shown, the plurality of swirler vanes 130 may be positioned upstream of a plurality of radial fuel injectors 135, each of which is formed with a plurality of discharge orifices 145 for discharging fuel such as a premix gas into passage 125 within the premix chamber of a combustor.

With specific reference to FIG. 4, fuel nozzle 100 may further include an inner tube 150 that extends axially within nozzle body 105 and defines an inner passage 155. For example, in many embodiments, the inner tube 150 may extend from the flange 110 to the aft face 116. In particular embodiments, the inner tube 150 may be held in place via a first interference coupling between the inner tube 150 and the nozzle tip 115 and a second interference coupling between the inner tube and the radially inner surface of the flange 110. An interference fit (otherwise known as a press fit or friction fit), is a fit between two parts in which the external dimension of one part slightly exceeds the internal dimension of the part into which it has to fit. For example, in the present case, the dimensions of the external surface of the inner tube 150 may slightly exceed the internal dimension of the flange 110 and the internal dimension of the nozzle tip 115.

In various embodiments, the inner passage 155 may feed air to the combustion zone 42 or may be configured for receipt of a liquid fuel delivery cartridge. In some embodiments, an intermediate tube 160 may extend axially within nozzle body 105. Intermediate tube 160 is positioned around the inner tube 150 in a concentric manner but with a larger diameter to create an intermediate passage 165. Intermediate passage 165 provides for the flow of e.g., diffusion gas, curtain air, or purge air through orifice 166. Similarly, an outer tube 170 extends axially along nozzle body 105. Outer tube 170 is positioned around the intermediate tube 160 in a concentric manner but with a larger diameter to create an outer passage 175. Outer passage 175 provides for carrying fuel such as a premix gas. During normal (non-flamehold) operation of fuel nozzle 100, fuel is forced to discharge from outer passage 175 by exiting through discharge orifices 145 in radial fuel injectors 135.

Still referring to the nozzle shown in FIGS. 3 and 4, in many embodiments the nozzle tip 115 may be located at the aft end 104 of the fuel nozzle. The nozzle tip 115 is sized to engage the nozzle body 105 and is typically welded thereto at interface 180. In various embodiments, the nozzle tip 115 may be formed with an interior annular shoulder 185 (FIG. 2) that receives the forward edge of intermediate tube 160, and which is welded or brazed at this forward edge. At or near shoulder 185 is also where the forward or downstream end of the intermediate passage 165 is closed.

Figure 5:
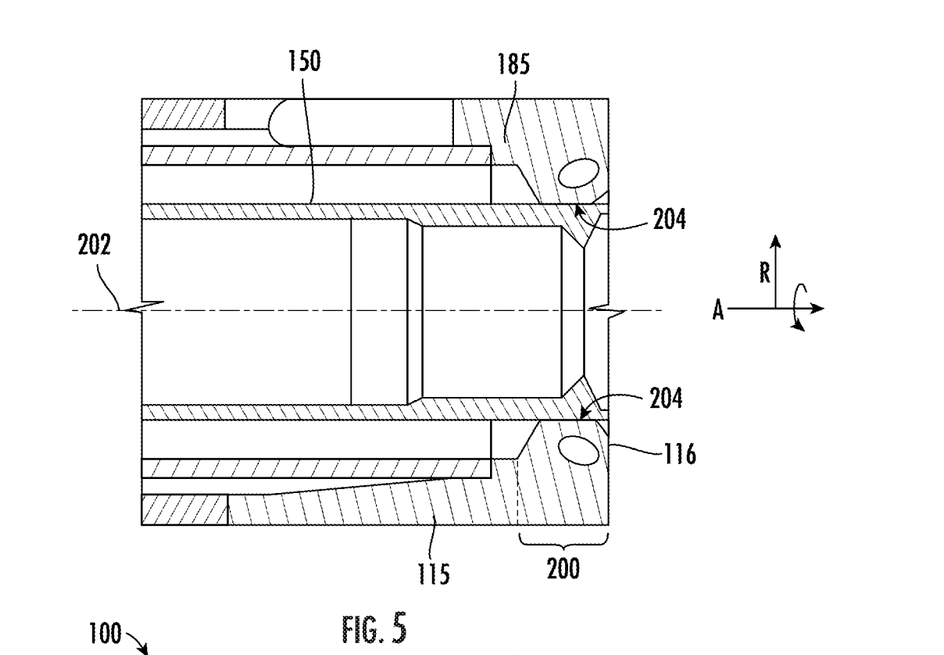
FIG. 5 illustrates an enlarged cross-sectional view of the aft end of the fuel nozzle prior to having any repairs performed thereto, in accordance with embodiments of the present disclosure.

FIG. 5 illustrates an enlarged cross-sectional view of the aft end 104 of the fuel nozzle 100 prior to having any repairs performed thereto, in accordance with embodiments of the present disclosure. As shown, the nozzle tip 115 may include a radial projection 200 that extends radially inwards, for example, towards an axial centerline 202 of the fuel nozzle 100. In exemplary embodiments, the radial projection 200 may extend annularly around the inner tube 150 and may be in contact therewith, such that the inner tube 150 is held in place by the radial projection 200 via an interference fit. As shown in FIG. 4, the radial projection 200 may be disposed immediately forward the aft face 116. For example, in some embodiments, the radial projection 200 may be disposed axially between the aft face 116 and the annular shoulder 185.

In particular embodiments, the nozzle tip 115 includes a pre-removal contact surface 204 that forms a worn interference fit with the inner tube 150. More specifically, the radial projection 200 of the nozzle tip 115 may define the pre-removal contact surface 204, such that it is the radially inwardmost surface of the nozzle tip 115. During operation of the gas turbine 10, the pre-removal contact surface 204 may be exposed to various forces and stresses, e.g., vibrational forces of the gas turbine 10 and thermal stresses caused by the high temperatures of the combustion zone 42. These forces and stresses may cause frictional wear between the pre-removal contact surface 204 and the inner tube 150 over time, thereby inhibiting the pre-removal contact surfaces 204 ability to create an effective press or interference fit with the inner tube 150. In this way, the pre-removal contact surface 204 may not be capable of forming an effective interference fit with the inner tube 150 due to the material that has worn away during the operation of the gas turbine, which could result in leaks and/or losses in efficiency.

Figure 6:
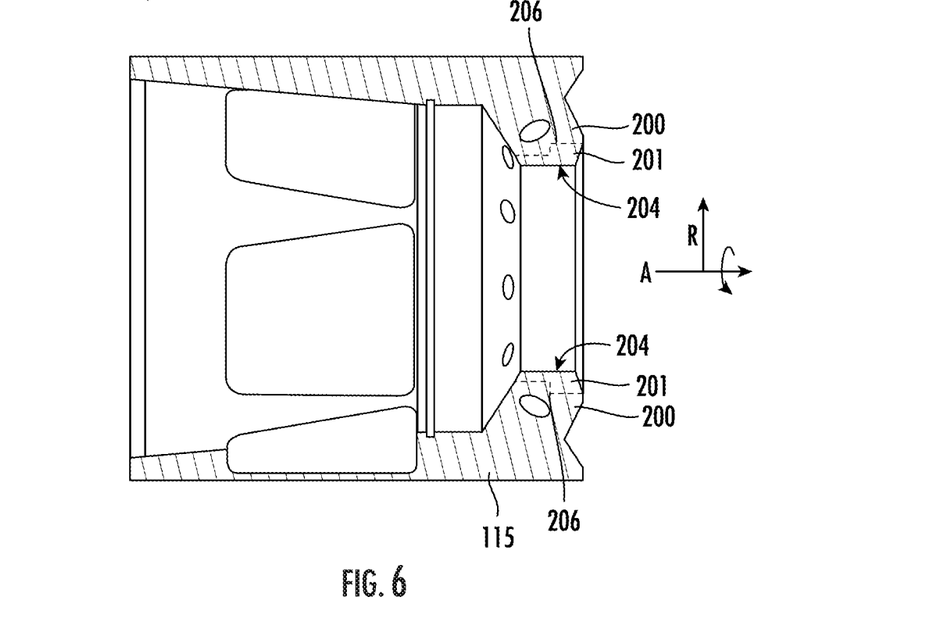
FIG. 6 illustrates an enlarged cross-sectional view of a nozzle tip, in accordance with embodiments of the present disclosure.

FIGS. 6-10 illustrate a nozzle tip 115 along different stages of a servicing method, such as the methods of servicing a fuel nozzle 1200 and 1300 described herein, which may advantageously restore a proper interference fit between the nozzle tip 115 and the inner tube 150. In many embodiments, the servicing method may be performed in the sequence shown in FIGS. 6-9. For example, FIG. 6 illustrates a nozzle tip 115, from which the inner tube 150 has been decoupled and removed from the fuel nozzle 100, in order to expose the pre-removal contact surface 204 prior to machining. As shown in FIG. 6, the dashed line 206 may represent the material 201 that is to be removed by the machining process, i.e., the material 201 radially inward from the dashed line 206 is to be removed by a machining process. In exemplary embodiments, the material 201 that is to be removed is worn and/or out of engineering design tolerance due to use within a gas turbine 10.

Figure 7:
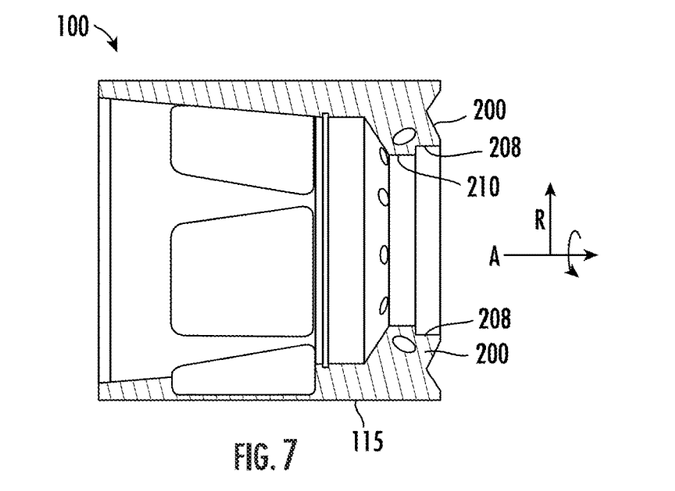
FIG. 7 illustrates an enlarged cross-sectional view of a nozzle tip, in accordance with embodiments of the present disclosure.

FIG. 7 illustrates a nozzle tip that has undergone a removal process, in which the pre-removal contact surface 204 has been machined away. In various embodiments, the removal process may utilize either or both of a conventional (or traditional) machining process or a non-conventional (or nontraditional) machining process. For example, a conventional machining process may include, but is not limited to, turning, boring, drilling, swanning, broaching, filling, planing, and/or milling processes. Further, a non-conventional machining process may include, but is not limited to, Ultrasonic Machining (USM), Water Jet Machining (WJM), Chemical Machining (CHM), Electrochemical Machining (ECM), Electrical Discharge Machining (EDM), Laser Beam Machining (LBM), and/or Plasma Beam Machining (PBM). Conventional and non-conventional machining processes are generally understood by those of skill in the art and, as such, are not shown or described in further detail herein for the sake of clarity and concision.

As shown, after the machining process is complete, the nozzle tip 115 may define an annular groove 208. In many embodiments, the annular groove 208 may include a protrusion 210 that extends radially inward. In other embodiments (not shown), the radially innermost surface of the annular groove may extend generally linearly, such that there is no protrusion(s) defined by the annular groove. The protrusion 210 may provide increased surface area for the replacement coupon 214 (FIG. 8) to contact, thereby increasing the retention strength of the fixed connection between the nozzle tip 115 and the annular groove 208. In various embodiments, the replacement coupon 214 may be fixedly coupled to the annular groove 208 via a brazing or welding. However, in exemplary embodiments, the replacement coupon 214 may be fixedly coupled to the annular groove 208 via a brazing process. In such embodiments, the protrusion 210 may provide a surface for the deposition of a braze material, which may subsequently be heated using a braze furnace to fixedly couple the replacement coupon 214 to the annular groove 208. In many embodiments, the braze material may be disposed directly between the annular grove 208 and the replacement coupon 214. In various embodiments, the braze material may be, but is not limited to, copper, nickel, silver, aluminum, gold, or other suitable materials.

Figure 8:
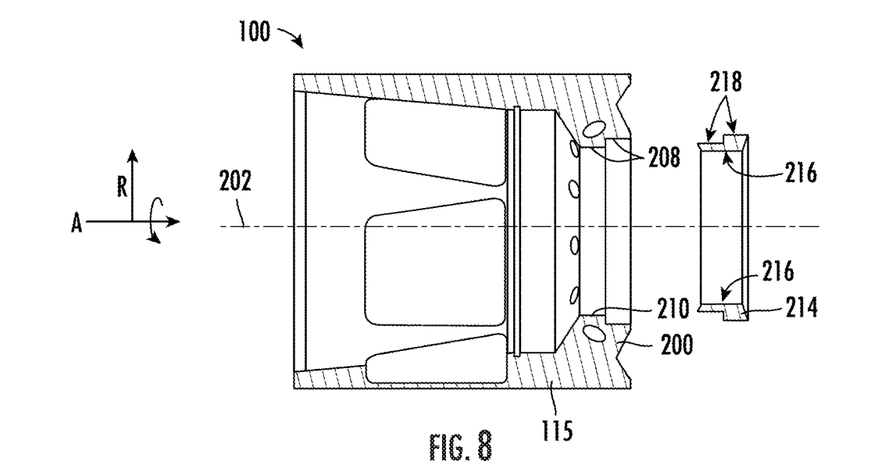
FIG. 8 illustrates an enlarged cross-sectional view of a nozzle tip, in accordance with embodiments of the present disclosure.
Figure 9:
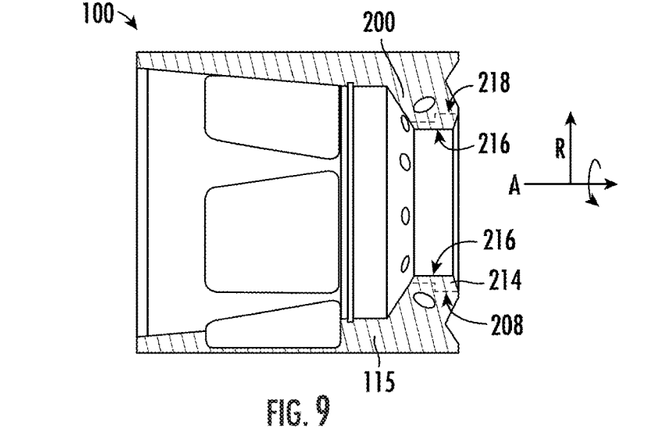
FIG. 9 illustrates an enlarged cross-sectional view of a nozzle tip, in accordance with embodiments of the present disclosure.

Once the fixed connection between the annular groove 208 defined in the nozzle tip 115 and the replacement coupon 214 is established, the nozzle tip 115 and the replacement coupon 214 may form continuous surfaces with one another, such that there are no voids, gaps, or cavities between the nozzle tip 115 and the replacement coupon 214. In exemplary embodiments, the replacement coupon 214 may include a radially outermost surface 218 that corresponds with the annular groove 208. In this way, the replacement coupon may be fully seated within, and entirely in contact with, the annular groove 208.

In particular embodiments, the dimensions of the replacement coupon 214 are substantially the same as the material that has been removed to form the annular groove 208. For example, in some embodiments, the dimensions of the replacement coupon 214 may be within (+/−) 10% of the material that has been removed to form the annular groove 208. In other embodiments, the dimensions of the replacement coupon 214 may be within (+/−) 5% of the material that has been removed to form the annular groove 208. In various embodiments, the dimensions of the replacement coupon 214 may be within (+/−) 2.5% of the material that has been removed to form the annular groove 208.

Figure 10:
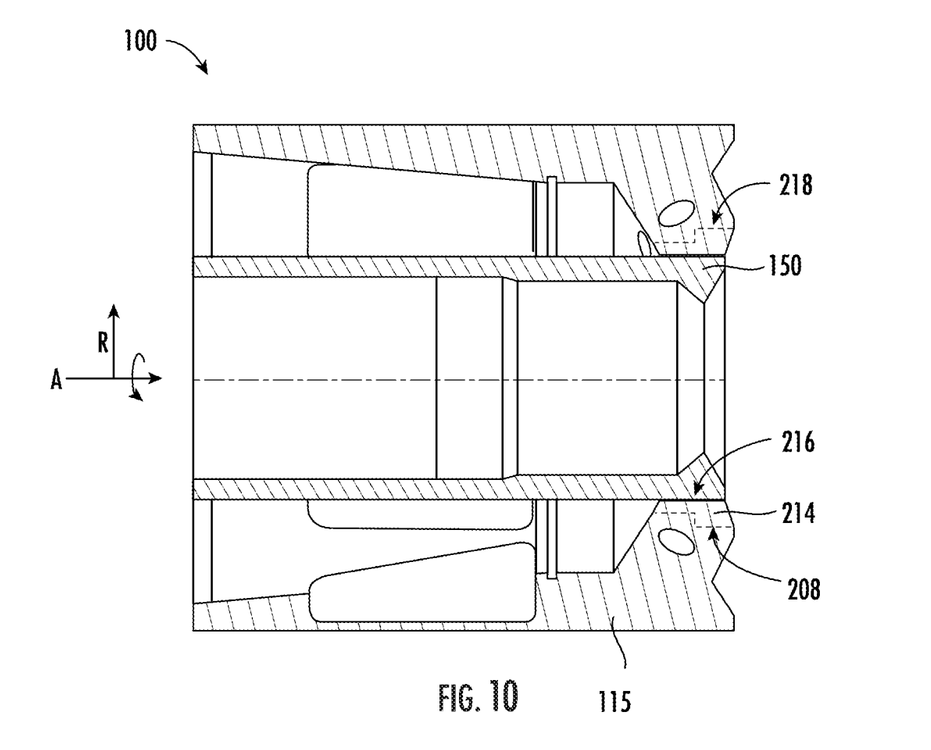
FIG. 10 illustrates an enlarged cross-sectional view of a nozzle tip, in accordance with embodiments of the present disclosure.

As shown in FIG. 10, following the repair process, the inner tube 150 may be inserted back into the nozzle 100. In particular embodiments, the replacement coupon 214 may define a contact surface or post-removal contact surface 216, which advantageously forms a restored interference fit with the inner tube 150. For example, the post-removal contact surface restores the tight engineering design tolerances, which enables the post-removal contact surface 216 of the replacement coupon 214 to form an interference fit with the inner tube 150. In this way, the fuel nozzle 100 may be operable without any leaks at the joint formed by the interference fit between the replacement coupon 214 and the inner tube 150. In exemplary embodiments, once the inner tube 150 is re-inserted into the fuel nozzle 100, the post-removal contact surface may annularly surround the inner tube 150 and form a restored interference fit therewith. As shown in FIG. 10, the contact surface or post-removal contact surface 216 may be the radially innermost surface of the replacement coupon 214.

In many embodiments, the nozzle tip 115 may be formed of a first material, and the replacement coupon may be formed of a second material. The second material may have a greater resistance to wear than the first material. This may advantageously extend the life of the fuel nozzle 100. For example, the increased wear resistance of the replacement coupon 214 may allow the fuel nozzle 100 to be used within a gas turbine 10 for a longer period of time without having to be removed for repair, which can advantageously improve the overall efficiency of the power plant.

In this regard, the method of servicing a fuel nozzle described herein may be performed on fuel nozzles that have undergone a duty cycle and are in need of repair, fuel nozzles that have undergone a duty cycle and are not in need of repair, or fuel nozzles that have not undergone any duty cycles. For example, the increased wear resistance of the replacement coupon 214 may advantageously increase the life of the fuel nozzle regardless of whether or not it has been in operation. As used herein, "duty cycle" may refer to a component or components that have spent a certain amount of time operating within a gas turbine. In this way, a component that has not undergone any duty cycles has never been used in the operation of a gas turbine.

Figure 11:
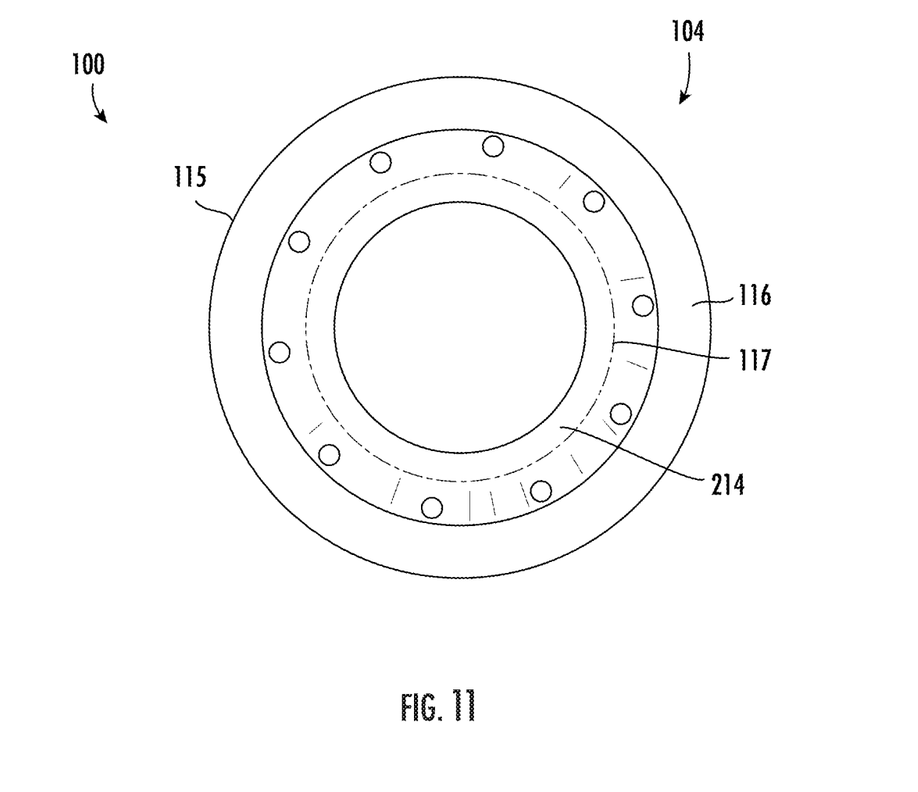
FIG. 11 illustrates a plan view of an aft face of a fuel nozzle from along an axial centerline of the fuel nozzle, in accordance with embodiments of the present disclosure.

FIG. 11 is a plan view of the aft face 116 of a fuel nozzle 100 from along the axial centerline 202. The fuel nozzle shown in FIG. 5 has undergone a servicing method, such as the servicing methods 1200 or 1300 described herein, as indicated by the fixed connection line 117 disposed between the aft face 116 of the nozzle tip 115 and the replacement coupon 214. As discussed above, the fixed connection line 117 may be the coupling between the radially outermost surface 218 of the replacement coupon 214 and the annular groove 208.

Figure 12:
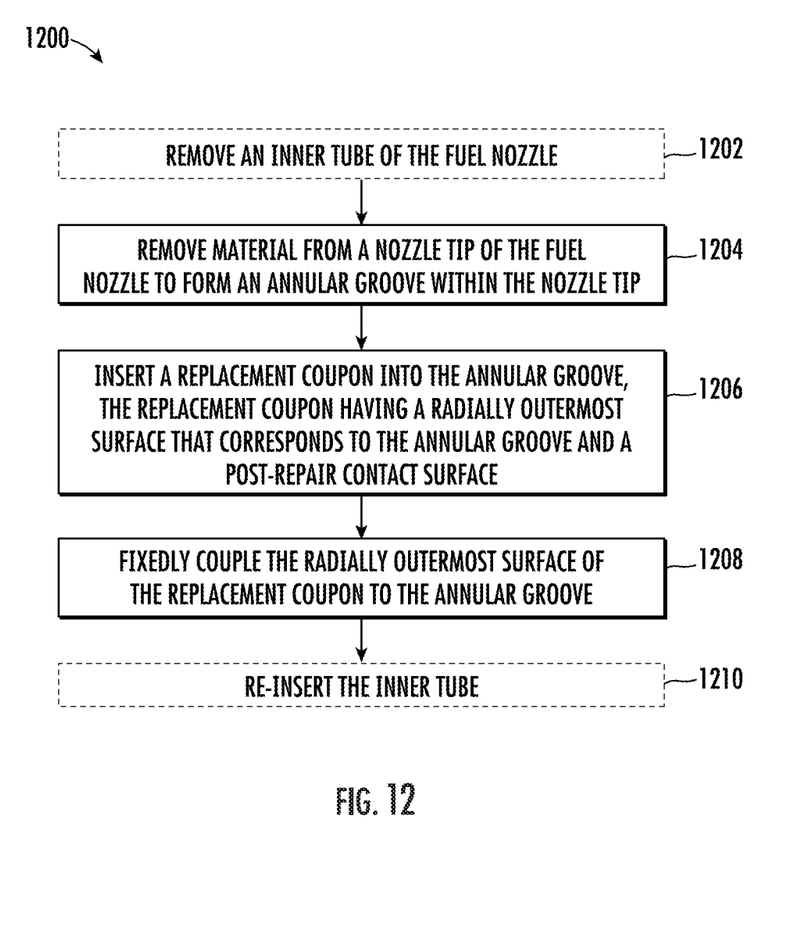
FIG. 12 is a flow chart of a method of servicing a fuel injector, in accordance with embodiments of the present disclosure.

FIG. 12 is a flow chart of a sequential set of steps 1202 through 1210, which define a method 1200 of servicing a fuel nozzle (such as the fuel nozzle 100 described herein), in accordance with embodiments of the present disclosure. As shown, the method 1200 may include optional steps (as indicated by dashed boxes) and non-optional steps (as indicated by solid boxes). For example, the method 1200 may include an optional step 1202 of removing an inner tube 150 from a fuel nozzle 100 (FIG. 6). In various embodiments, the method 1200 may further include a step 1204 of removing material 201 from a nozzle tip 115 to form an annular groove 208 within the nozzle tip 115. In exemplary embodiments, the step 1202 may be performed prior to the step 1204. In many embodiments, the method may further include a step 1206 of inserting a replacement coupon 214 into the annular groove 208. The replacement coupon 214 may define a radially outermost surface 218 that corresponds to the annular groove 208. In exemplary embodiments, the replacement coupon 214 may also define a post-removal contact surface 216. In many embodiments, the method 1200 may further include a step 1208 of fixedly coupling the radially outermost surface 218 of the replacement coupon 214 to the annular groove 208. In some embodiments, the method 1200 may include an optional step 1210 of re-inserting the inner tube 150.

Figure 13:
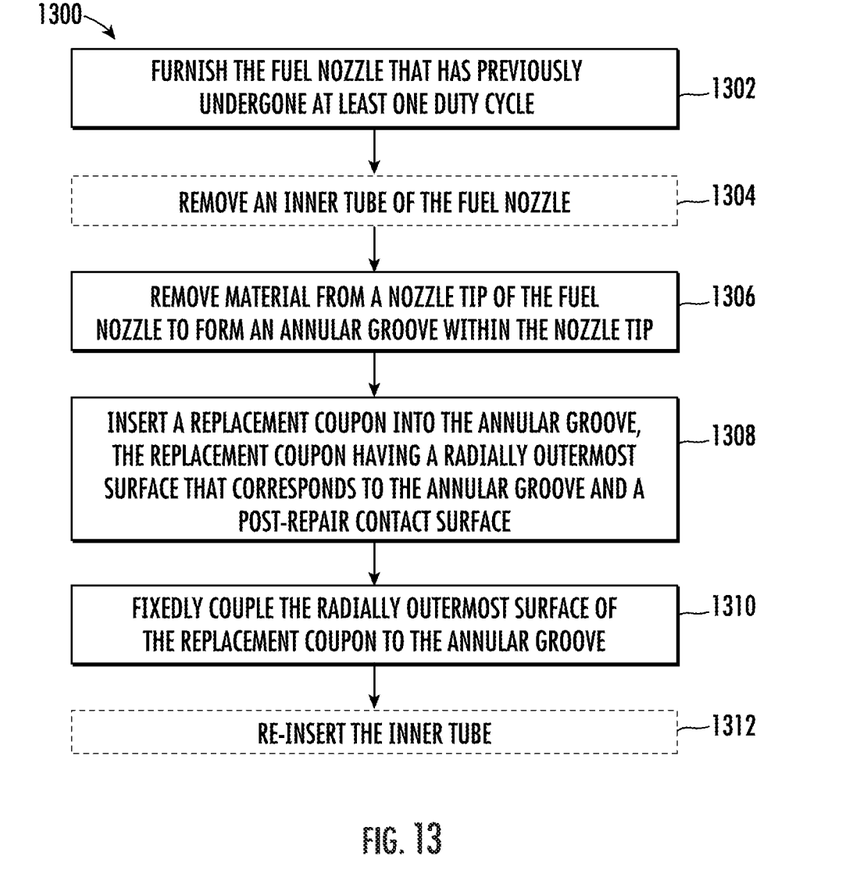
FIG. 13 is a flow chart of a method of servicing a fuel injector, in accordance with embodiments of the present disclosure.

FIG. 13 flow chart of a sequential set of steps 1302 through 1312, which define a method 1300 of servicing a fuel nozzle (such as the fuel nozzle 100 described herein), in accordance with embodiments of the present disclosure. As shown, the method 1300 may include optional steps (as indicated by dashed boxes) and non-optional steps (as indicated by solid boxes). For example, the method 1300 may include an optional step 1302 of furnishing the fuel nozzle 100 that has previously undergone at least one duty cycle. In many embodiments, the method 1300 may further include a step 1304 of removing an inner tube 150 from a fuel nozzle 100 (FIG. 6). In various embodiments, the method 1300 may further include a step 1306 of removing material 201 from a nozzle tip 115 to form an annular groove 208 within the nozzle tip 115. In exemplary embodiments, the step 1304 may be performed prior to the step 1306. In many embodiments, the method 1300 may further include a step 1308 of inserting a replacement coupon 214 into the annular groove 208. The replacement coupon 214 may define a radially outermost surface 218 that corresponds to the annular groove 208. In exemplary embodiments, the replacement coupon 214 may also define a post-removal contact surface 216. In many embodiments, the method 1300 may further include a step 1310 of fixedly coupling the radially outermost surface 218 of the replacement coupon 214 to the annular groove 208. In some embodiments, the method 1300 may include an optional step 1312 of re-inserting the inner tube 150.

The methods of servicing a fuel nozzle described herein may advantageously allow for restoration of the interference fit between the nozzle tip and the inner tube, without requiring the entire nozzle tip to be replaced. This favorably reduces both the cost and the time necessary to service the fuel nozzle.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method of servicing a fuel nozzle of a combustor, the combustor including an end cover, a head end volume partially defined by the end cover, and a combustion chamber downstream from the head end volume, the fuel nozzle extending from a forward end coupled to the end cover, through the head end volume, to an aft end at the combustion chamber, a nozzle tip being disposed at the aft end of the fuel nozzle, wherein the nozzle tip includes a pre-removal contact surface that forms a worn interference fit with an inner tube, the method comprising:

removing the inner tube from the nozzle tip;
forming an annular groove in the nozzle tip by machining away the pre-removal contact surface from the nozzle tip;
inserting a replacement coupon into the annular groove, the replacement coupon having a radially outermost surface that corresponds to the annular groove and a post-removal contact surface;
fixedly coupling the radially outermost surface of the replacement coupon to the annular groove.

2. The method as in claim 1, wherein the fuel nozzle comprises a flange disposed at the forward end of the fuel nozzle and coupled to the end cover of the combustor, the nozzle tip defining an aft face, a nozzle body extending axially between the flange and the nozzle tip, a swirler having a plurality of swirler vanes and extending radially outwardly from the nozzle body, the swirler disposed between the forward end and the aft end of the fuel nozzle, an inner tube disposed within the nozzle body and extending from the flange to the aft face.

3. The method as in claim 1, further comprising re-inserting the inner tube after the fixedly coupling step, wherein the post-removal contact surface of the replacement coupon forms a restored interference fit with the inner tube.

4. The method as in claim 1, wherein the fixedly coupling step comprises brazing the radially outermost surface of the replacement coupon to the nozzle tip.

5. The method as in claim 1, wherein the material is machined away using one of a conventional machining process or a non-conventional machining process.

6. The method as in claim 1, wherein the annular groove includes a protrusion that extends radially inward.

7. The method as in claim 1, wherein dimensions of the replacement coupon are substantially the same as the material that has been removed to form the annular groove.

8. The method as in claim 1, wherein the nozzle tip comprises a first material, and wherein the replacement coupon comprises a second material having a greater wear resistance than the first material.

9. The method as in claim 1, further comprising furnishing the fuel nozzle, the fuel nozzle having undergone at least one duty cycle.

* * * * *